United States Patent
Vaidya et al.

(10) Patent No.: US 7,133,970 B2
(45) Date of Patent: Nov. 7, 2006

(54) LEAST MEAN SQUARE DYNAMIC CACHE-LOCKING

(75) Inventors: Priva N. Vaidya, Shrewsbury, MA (US); Moinul H. Khan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 10/430,042

(22) Filed: May 5, 2003

(65) Prior Publication Data

US 2004/0225843 A1    Nov. 11, 2004

(51) Int. Cl.
*G06F 12/12*    (2006.01)
(52) U.S. Cl. .................. 711/133; 711/152; 711/163
(58) Field of Classification Search ............. None
See application file for complete search history.

(56) References Cited

U.S. PATENT DOCUMENTS

| | | | | |
|---|---|---|---|---|
| 5,249,286 A | * | 9/1993 | Alpert et al. | 711/125 |
| 5,875,464 A | * | 2/1999 | Kirk | 711/129 |
| 6,178,482 B1 | * | 1/2001 | Sollars | 711/129 |

FOREIGN PATENT DOCUMENTS

JP        09034792 A  *  2/1997

* cited by examiner

*Primary Examiner*—Kevin Verbrugge
(74) *Attorney, Agent, or Firm*—Lanny L. Parker

(57) ABSTRACT

A dynamic cache-locking algorithm may determine the most frequently used function(s) and the number of cache lines that should be locked into the instruction cache embedded into a processor. By evaluating the dynamic cache-locking algorithm, a determination may be made to lock an optimal amount of functions that correspond to a given, limited amount of instruction cache.

17 Claims, 3 Drawing Sheets

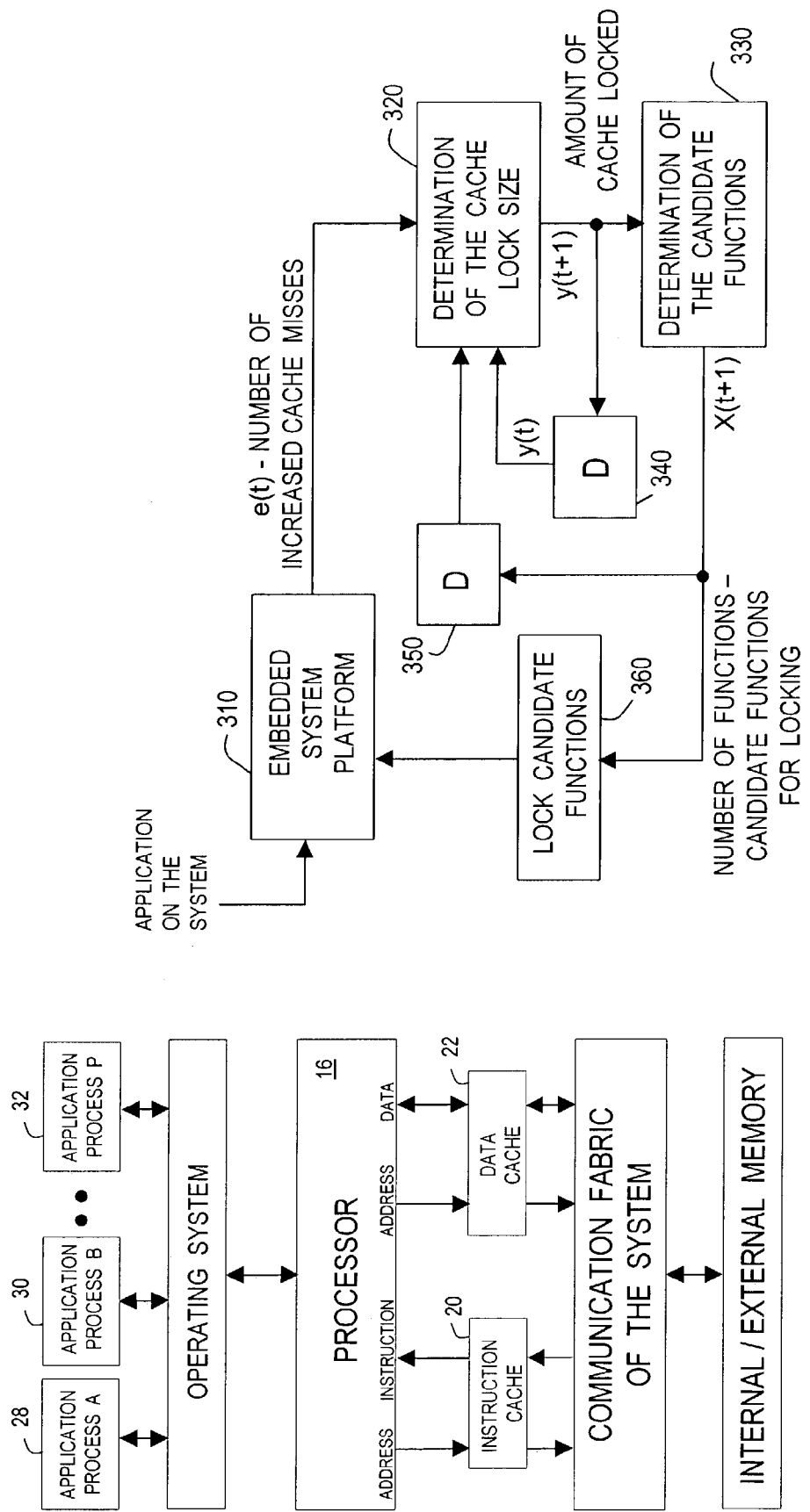

LEAST MEAN SQUARE DYNAMIC CACHE-LOCKING

A cache system ensures that applications get the same data as the system would have in an uncached system. Some systems include an instruction cache and a data cache as separate caches so that an instruction may be read and a load or store operation performed simultaneously. The cache provides a copy of instructions or memory data that has been recently read or written, so that it may be returned to the processor quickly and in a fixed period of time to keep a pipeline running.

In some systems setting the appropriate bits in a register may lock the cache. Performance critical routines stored in cache may be locked for an amount of time deemed important by the software. However, a disadvantage to locking code into the cache is that the effective cache size for the remaining program portions is reduced. Further, the locked memory area may be application dependent and the appropriate memory space for locking may be difficult to anticipate in advance.

Accordingly, there is a continuing need for better ways to provide a locking mechanism as a way to provide effective use of an embedded cache.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a diagram that illustrates provided services that may be stored in a cache that is capable of being locked in accordance with the present invention;

FIG. 3 is a block diagram that illustrates a mechanism for locking a cache memory in accordance with the present invention.

Figure 1:
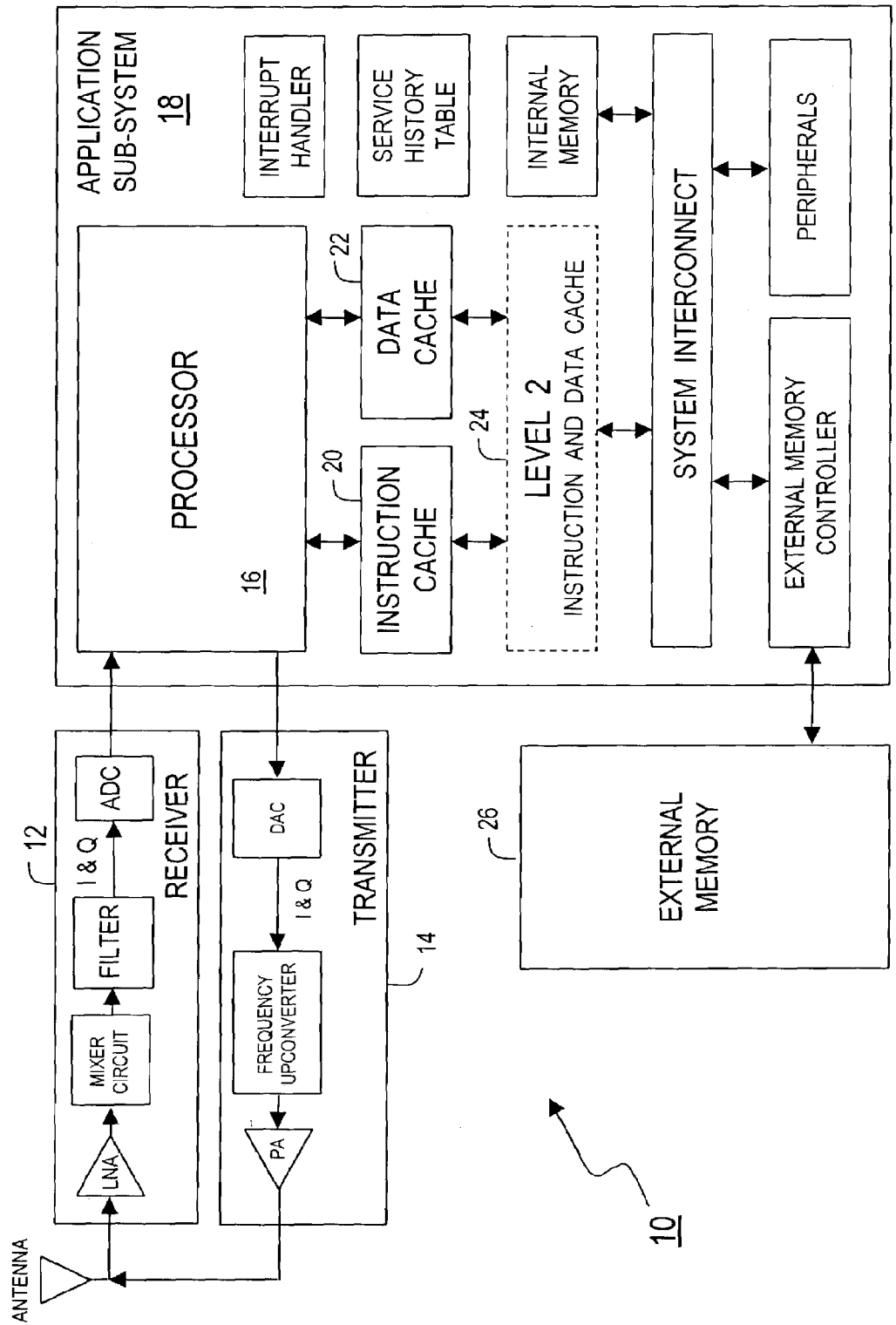
FIG. 1 illustrates features of the present invention for locking information in a cache that may be incorporated into a wireless communications device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be noted that the features of the present invention apply to any Operating Service (OS) that provides services to multiple applications. FIG. 1 illustrates features of the present invention that may be incorporated, for example, into a wireless communications device 10, although this is not a limitation of the present invention. The wireless communications device includes a transceiver that receives and transmits modulated signals from an antenna. In a receiver 12, a first receiver chain may include a Low Noise Amplifier (LNA) to amplify the received signal from the antenna. A mixer circuit may receive the modulated signal, down-converting the frequency of the modulated signal and providing quadrature signals to an Analog-to-Digital Converter (ADC). The digital representation of the quadrature signals may be supplied to baseband and applications processor 16. Baseband and applications processor 16 is connected to the transceiver to provide, in general, the digital processing of the received data within communications device 10.

A transmitter 14 receives digital data from baseband and applications processor 16 and converts the digital data to an analog signal using a Digital-to-Analog Converter (DAC). The analog signal may be modulated by a frequency up-converter, with the gain of the modulated signal adjusted by a Power Amplifier (PA). Receiver 12 may include second receiver chain and transmitter 14 may include a second transmit path when multiple antennas (not shown) are included. Also, either a direct conversion receiver or a super-heterodyne receiver may be used without limiting the present invention.

Application sub-system 18 includes baseband and applications processor 16 and is capable of fetching instructions, generating decodes, finding operands, performing the appropriate actions and storing results. Accordingly, application sub-system 18 includes an instruction cache 20 and a data cache 22. In addition, an L2 cache memory 24, also called the secondary cache, may reside on the microprocessor chip or be included on a separate chip depending on the system architecture.

A memory device 26 may be connected to application sub-system 18 to store data and/or instructions. In some embodiments, memory device 26 may be volatile memories such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In other embodiments, the memory devices may be nonvolatile memories such as, for example, an Electrically Programmable Read-Only Memory (EPROM), an Electrically Erasable and Programmable Read Only Memory (EEPROM), a flash memory, a Ferroelectric Random Access Memory (FRAM), a Polymer Ferroelectric Random Access Memory (PFRAM), a Magnetic Random Access Memory (MRAM), an Ovonics Unified Memory (OUM) or any other device capable of storing instructions and/or data. However, it should be understood that the scope of the present invention is not limited to these examples.

FIG. 2 is a simplistic diagram to show an application sub-system and multiple applications running on baseband and applications processor 16. Instruction cache 20 and data cache 22 may be called when running applications operating within application sub-system 18. The processor operating system may make calls to appropriate services or application processes at particular operating times. By way of example, an application process 28 may be a call for a timer Interrupt Service Routine (ISR) service that executes timed chores in a controlled environment. When the ISR service is called, an interrupt received by baseband and applications processor 16 may transfer control to a handler to assign network drivers to properly dispose of the interrupts. By way of a further example, an application process 30 may be a Direct Memory Access (DMA) service that may be used to off-load many data-transfer tasks from baseband and applications processor 16. Application process 32 is yet another example of a Flush Cache service that may periodically run to perform memory management on the system to complete transactions having their writes flushed to an external memory. Note that application processes 28, 30 and 32 are exemplary and illustrate processes under control of the operating system that may be selected to dynamically supply data used by the cache-locking algorithm. It is fully intended that other services provided by application sub-system 18 may also be selected.

Operating systems running multiple processes may suffer from cache pollution. Cache pollution may be caused by context switches where data and instructions in the cache related to one process are replaced by data and instruction related to another process that is executing. There is an adverse effect on the overall system performance due to increased cache misses and cache thrashing. This impact on system performance is further degraded for systems with large memory latency, for example, in low-power embedded systems.

FIG. 3 is a block diagram that illustrates a mechanism, whether accomplished in hardware, software or in combination, for locking portions of a cache memory in accordance with the present invention. By incorporating a dynamic cache-locking algorithm, selected lines of instruction cache 20, data cache 22, L2 cache and/or OS-managed internal memory may be locked. The block diagram describes one dynamic cache-locking algorithm that may be utilized by the operating system to improve system performance by decreasing cache misses.

As one example, the system may use a Least Mean Square (LMS) based algorithm to define the highest cache efficiency over a range of time, and then, dynamically provide improvements to that operating point. The optimal operating point with respect to the locked cache amount may be dynamically changed to improve the overall system performance. The proposed method tracks the changes and modifies the locking policy to continually improve the operating point. Note that the same dynamic cache-locking algorithm may be applied to the data cache to lock frequently used data structures and to the instruction cache to lock frequently used instructions.

The block diagram shows an adaptive filter using the stochastic gradient algorithm known as the Least Mean-Square (LMS) algorithm that incorporates adaptations for cache locking control. The cache-locking algorithm in accordance with the present invention may be described as follows:

$$y(t+\Delta t)=y(t)+R^*e(t)x(t) \quad \text{Equation 1}$$

where y(t+Δt) is the size of the locked caches in the time instance (t+Δt); y(t) is the sum of all sizes of all the locked functions at time t, R is an update constant, e(t) is defined by either the number of increased cache misses in a previous system interval or by the difference of the optimal cache miss rate and the observed cache miss rate; and x(t) is the number of functions locked in the y(t) size of cache at instant of time t+Δt.

The embedded system platform 310 monitors each application in process to provide an output that is indicative of dynamic changes associated with the instruction-cache-miss counter. The output e(t) may indicate the number of increased cache misses compared to the previous time interval, or in an alternate embodiment, may provide the difference of the observed cache miss rate for the present time interval with an optimal cache miss rate. A block 320 provides an updated cache lock size y(t+Δt), and thus, provides the amount of cache to be locked during the time interval t+Δt in accordance with evaluation of the algorithm corresponding to Equation 1. Based on the dynamic instruction-cache-miss behavior, the operating system makes locking/unlocking decisions for each time interval Δt.

Inherent to the system is the feedback mechanism. The operating system dynamically monitors the instruction-cache-miss counter and provides that information to the LMS algorithm at time intervals Δt. The LMS algorithm uses this system-generated information in block 340 along with the previous state decision provided in block 350 to make a dynamic decision about locking and unlocking specific functions (Block 330). In block 360 the candidate functions are locked and unlocked. The operating system may control the cache efficiency over a range of time to improve the overall system performance. The present invention is dynamic in that the size of the locked cache may be continually changed in accordance with data derived about the services in operation by the operating system.

Figure 4:
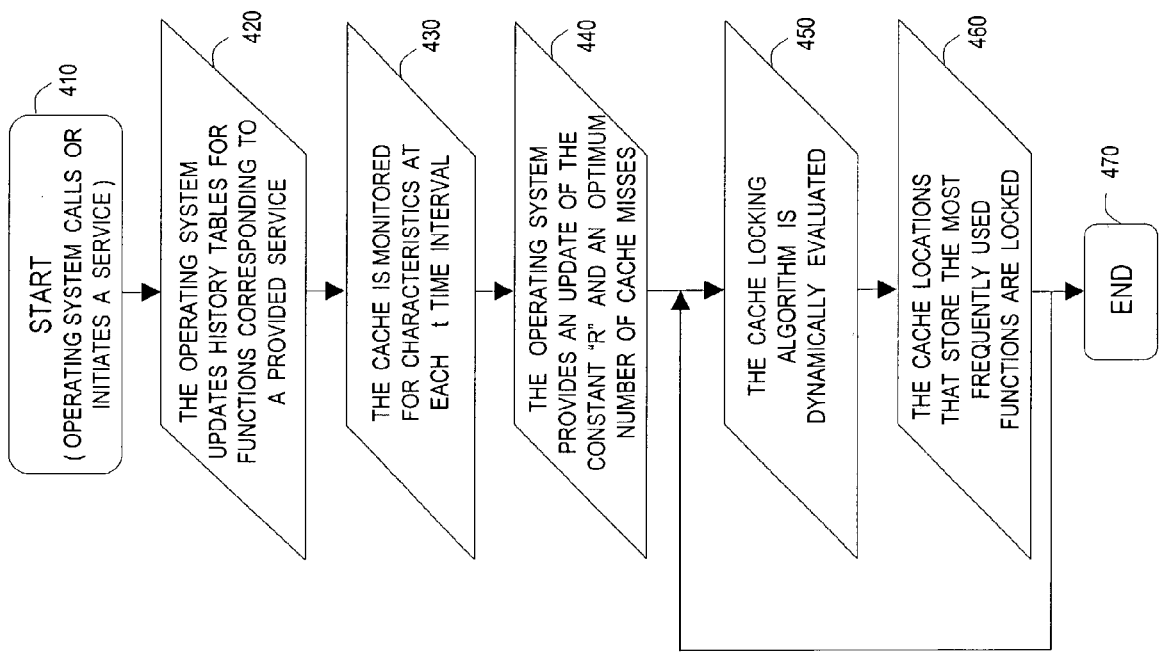
FIG. 4 is a flow diagram for operations and functions run during evaluation of the LMS based dynamic cache-locking algorithm.

FIG. 4 is a flow diagram showing the procedure for evaluating the dynamic cache-locking algorithm used to selectively lock lines of either instruction cache 20 or data cache 22. The operating system calls or initiates a service (Process 410) such as, for example, one of the application processes 28, 30 or 32 that is shown in FIG. 2. The operating system then updates a history table (see FIG. 1) with values corresponding to the functions describing the services (Process 420). Whenever any of the functions are called, the history table may be updated to provide a record of cache effectiveness. The operating system monitors the instruction cache 20 and the data cache 22 at specified time intervals and records the number of instruction-cache-misses that occur in each time interval (Process 430). The operating system provides parameters such as, for example, an update of the constant "R", the number of cache-misses, an optimum number of instruction-cache-misses, etc. (Process 440) that may be used in evaluating the adaptive algorithm (Process 450). The LMS adaptive, cache-locking algorithm is evaluated for each of the services and lines of the cache may be locked (Process 460) that correspond to the most frequently used functions.

It should be noted that the amount of data locked in the cache may be limited, but the LMS algorithm presented and described in FIGS. 3 and 4 may determine the most frequently used function(s) and the number of cache lines that should be locked into either the instruction cache 20 or the data cache 22. In accordance with the present invention, a determination may be made to lock an optimal amount of functions that correspond to a given, limited amount of instruction cache. It should be further noted that the LMS algorithm may be used for virtually addressed cache as well as physically addressed caches. By utilizing the LMS algorithm the overall system performance and the cache/memory performance may be enhanced.

It should be pointed out that embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. It has been shown that a dynamic cache-locking algorithm may be used to lock instruction cache, data cache, L2 cache and/or OS-managed internal memory in a communications device. However, the present invention may be used in non-wireless communications devices that may include desktop processors, laptop processors, medical or biotech equipment, automotive safety and protective equipment, and automotive infotainment products. However, it should be understood that the scope of the present invention is not limited to these examples.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   running a provided service in a processor using a cache; and
   selecting lines of the cache to lock in accordance with evaluating a Least-Mean-Square (LMS) based cache-locking algorithm that receives cache characteristics for the provided service.

2. The method of claim 1 further including:
   using the dynamic cache-locking algorithm to lock at least one of an instruction cache, a data cache, an L2 cache or an OS-managed internal memory.

3. The method of claim 1 further including:
   receiving data stored in a history table for functions corresponding to the provided service in the processor.

4. The method of claim 1 wherein evaluating the dynamic cache-locking algorithm further includes:
   receiving an optimum number of cache misses for functions corresponding to the provided service in the processor.

5. The method of claim 1 wherein selecting lines of the cache to lock further includes:
   selecting lines of the cache to lock corresponding to frequently used services.

6. An article comprising:
   a computer-readable storage medium, the medium having stored thereon instructions, the instructions, when executed, resulting in a method of selecting lines of a cache to lock in accordance with results from evaluating a Least-Mean-Square(LMS) based algorithm that receives cache characteristics for a service provided by a processor.

7. The article of claim 6 further including:
   storing data in a history table that corresponds to the service provided by the processor, the stored data used to evaluate the dynamic cache-locking algorithm.

8. The article of claim 7 further including:
   providing an optimum number of cache misses for functions corresponding to the service provided by the processor for use in evaluating the dynamic cache-locking algorithm.

9. The article of claim 8 further including:
   providing a number of cache-misses at time intervals to be used in evaluating the LMS based algorithm.

10. A method comprising:
    utilizing a dynamic cache-locking algorithm to determine lines of a cache to lock based on a number of cache-misses in a time interval, the cache-misses being determined for a service being operated by a processor.

11. The method of claim 10 wherein utilizing a dynamic cache-locking algorithm further includes evaluating a Least Means Square (LMS) based algorithm.

12. The method of claim 11 further including:
    storing data in a history table that corresponds to the service provided by the processor, the stored data used to evaluate the LMS based algorithm.

13. The method of claim 10 further including:
    using the dynamic cache-locking algorithm to lock at least one of an instruction cache, a data cache, an L2 cache or an OS-managed internal memory.

14. A system comprising:
    an omni-directional antenna;
    a receiver coupled to the omni-directional antenna to process a modulated signal; and
    a processor coupled to receive quadrature signals from the receiver, the processor having a cache where an operating system of the processor selects lines of the cache to lock in accordance with evaluating a Least-Mean-Square (LMS) based cache-locking algorithm that receives cache characteristics for a service provided by the processor.

15. The system of claim 14, wherein a service provided by the processor is selected from at least a timer Interrupt Service Routine (ISR) service, a Direct Memory Access (DMA) service and a flush Cache service.

16. The system of claim 14, wherein a result of the dynamic cache-locking algorithm depends on data in a stored history table that corresponds to the service provided by the processor.

17. The system of claim 14, wherein a result of the dynamic cache-locking algorithm depends on cache-misses during set time intervals.

* * * * *